US012717726B2

(12) United States Patent
Cao et al.

(10) Patent No.: US 12,717,726 B2
(45) Date of Patent: Aug. 25, 2026

(54) PROCESS-IN-MEMORY (PIM)-AWARE ADDRESS HASHING

(71) Applicant: QUALCOMM Incorporated, San Diego, CA (US)

(72) Inventors: Rui Cao, San Diego, CA (US); Subbarao Palacharla, San Diego, CA (US); Pan Deng, San Diego, CA (US); Pankaj Deshmukh, San Diego, CA (US); Jungwon Suh, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 19/058,626

(22) Filed: Feb. 20, 2025

(65) Prior Publication Data

US 2026/0244577 A1 Aug. 20, 2026

(51) Int. Cl.
*G06F 12/1018* (2016.01)

(52) U.S. Cl.
CPC ................................ *G06F 12/1018* (2013.01)

(58) Field of Classification Search
CPC .................................................. G06F 12/1018
USPC ......................................................... 711/167
See application file for complete search history.

(56) References Cited

U.S. PATENT DOCUMENTS 11,693,585 B2 7/2023 Fishwick et al.
2020/0035291 A1* 1/2020 Kasibhatla ........... G11C 7/1006
2020/0285590 A1* 9/2020 Choi ................... G06F 12/0873
2022/0222010 A1 7/2022 Bachmutsky et al.
2024/0111672 A1* 4/2024 Cho .................... G06F 12/0223
2026/0016957 A1* 1/2026 Suh ......................... G06F 3/061

FOREIGN PATENT DOCUMENTS

WO WO-2017065928 A1 4/2017

OTHER PUBLICATIONS

International Search Report and Written Opinion—PCT/US2026/011865—ISA/EPO—May, 19, 2026.

* cited by examiner

*Primary Examiner* — Jared I Rutz
*Assistant Examiner* — Wei Ma
(74) *Attorney, Agent, or Firm* — Norton, Rose, Fulbright US LLP

(57) ABSTRACT

An apparatus includes a processing system including one or more memories and one or more processors coupled to the one or more memories. The processing system is configured to send, to a memory device, a first request associated with a first physical address of the memory device. The first physical address is in accordance with a first address selection scheme that includes an address hashing scheme. The processing system is further configured to send, to the memory device, a second request associated with a second physical address of the memory device. In accordance with the second request being associated with process-in-memory (PIM) operations by the memory device, the second physical address is in accordance with a second address selection scheme different than the first address selection scheme.

20 Claims, 8 Drawing Sheets

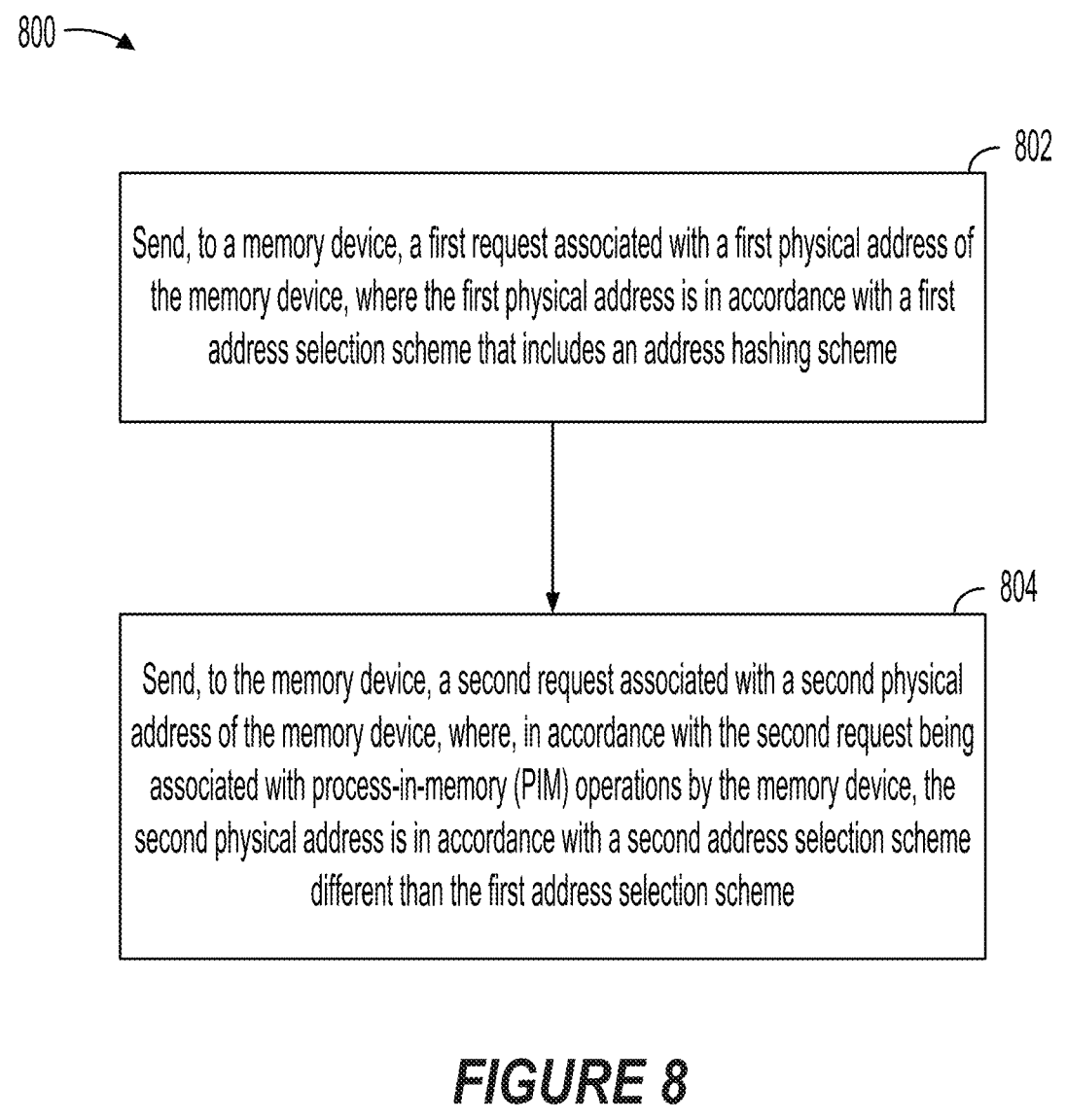

800

802

Send, to a memory device, a first request associated with a first physical address of the memory device, where the first physical address is in accordance with a first address selection scheme that includes an address hashing scheme

804

Send, to the memory device, a second request associated with a second physical address of the memory device, where, in accordance with the second request being associated with process-in-memory (PIM) operations by the memory device, the second physical address is in accordance with a second address selection scheme different than the first address selection scheme

*FIGURE 8*

PROCESS-IN-MEMORY (PIM)-AWARE ADDRESS HASHING

TECHNICAL FIELD

Aspects of the present disclosure relate generally to electronic devices, and more specifically, to electronic devices that include or access memory devices, such as dynamic random access memory (DRAM) devices.

INTRODUCTION

Electronic devices increasingly perform a variety of functions for users. For example, in addition to supporting voice calls, a mobile device (such as a smart phone) may support a variety of other operations and may include a variety of electronic components to support these operations. The operations may include, for example, image and video capture, health monitoring and activity tracking, wireless local area network (WLAN) communications, personal area network (PAN) communications, satellite communications, and other features. As another example, a vehicle may support wireless communications, navigation, and other driver assistance features such as adaptive cruise control, lane change assistance, collision avoidance, night vision, parking assistance, blind spot detection, lane keeping assistance, automated braking, partially autonomous driving, and fully autonomous driving.

To facilitate such a wide range of operations, memory devices are used to enable storage and retrieval of data. One example of a memory device is a dynamic random access memory (DRAM) device. A DRAM device may include volatile storage elements that facilitate relatively fast storage and retrieval of data. For example, in some systems, an integrated circuit may include one or more processors that store data to, and retrieve data from, a DRAM device that is coupled to the integrated circuit.

As the amount of data that is written to a DRAM device increases, performance may slow. For example, training and execution of large language models (LLMs) and other artificial intelligence (AI) applications may involve storing and retrieving a large amount of data to a DRAM device. In such cases, bandwidth of the DRAM device may limit system performance. Some techniques may be deployed to increase bandwidth of a DRAM device, such as by increasing a quantity of channels associated with a DRAM device. Such techniques may increase system cost and complexity.

BRIEF SUMMARY OF SOME EXAMPLES

The systems, methods and devices of this disclosure each have several innovative aspects, no single one of which is solely responsible for the desirable attributes disclosed herein.

In some aspects, an apparatus includes a processing system including one or more memories and one or more processors coupled to the one or more memories. The processing system is configured to send, to a memory device, a first request associated with a first physical address of the memory device. The first physical address is in accordance with a first address selection scheme that includes an address hashing scheme. The processing system is further configured to send, to the memory device, a second request associated with a second physical address of the memory device. In accordance with the second request being associated with process-in-memory (PIM) operations by the memory device, the second physical address is in accordance with a second address selection scheme different than the first address selection scheme.

In some further aspects, a method of operation of a memory controller includes sending, to a memory device, a first request associated with a first physical address of the memory device. The first physical address is in accordance with a first address selection scheme that includes an address hashing scheme. The method further includes sending, to the memory device, a second request associated with a second physical address of the memory device. In accordance with the second request being associated with process-in-memory (PIM) operations by the memory device, the second physical address is in accordance with a second address selection scheme different than the first address selection scheme.

In some additional aspects, a non-transitory computer-readable medium stores instructions executable by one or more processors to perform operations. The operations include sending, to a memory device, a first request associated with a first physical address of the memory device. The first physical address is in accordance with a first address selection scheme that includes an address hashing scheme. The operations further include sending, to the memory device, a second request associated with a second physical address of the memory device. In accordance with the second request being associated with process-in-memory (PIM) operations by the memory device, the second physical address is in accordance with a second address selection scheme different than the first address selection scheme.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

FIG. 8 is a flow chart illustrating an example of a method that supports PIM-aware address hashing.

Like reference numbers and designations in the various drawings indicate like elements.

DETAILED DESCRIPTION

Figure 1:
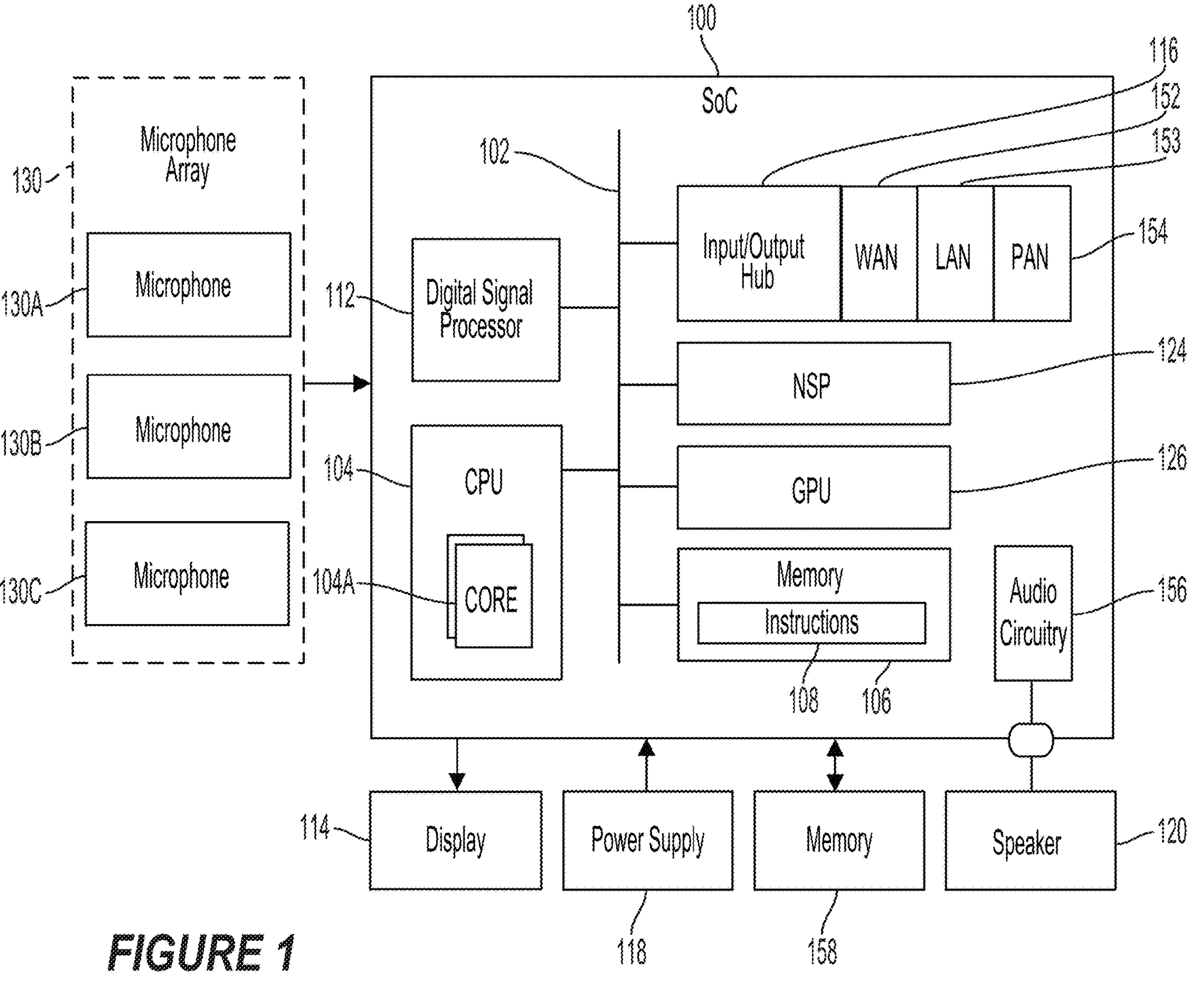
FIG. 1 is a block diagram illustrating an example of a system-on-chip (SoC) that supports PIM-aware address hashing.

In some aspects of the disclosure, address hashing associated with a memory device may be selectively enabled or disabled based on whether process-in-memory (PIM) operations are performed by the memory device. To illustrate, address hashing may be disabled for virtual pages that are processed using PIM operations and may enabled for virtual pages that are not processed using the PIM operations. In such examples, the virtual pages that use PIM operations may be written to and read from the memory device without using address hashing, and the virtual pages not using PIM operations may be written to and read from the memory device using address hashing. Further, address hashing may also be selectively enabled or disabled for other types of requests (in addition to data read and data write requests), such as commands that do not include data. Such requests may include, for example, PIM processing commands and other types of requests.

In some examples, address hashing may be selectively enabled or disabled using a hash enable attribute. The hash enable attribute may have a value indicating whether address hashing is enabled or disabled for a virtual page. In some other examples, address hashing may be selectively enabled or disabled using multiple hash operations. For example, a client may perform a "pre-hash" operation, and a memory controller may perform a "reverse hash" operation (e.g., to reverse effects of address hashing).

One or more features described herein may improve performance of a system that includes or accesses a memory device. For example, by selectively disabling address hashing for requests that use PIM operations, data may be more "clustered" in the memory device (e.g., where physical pages storing the data are relatively close together). As a result, PIM operations may be performed more efficiently (e.g., by enabling different virtual pages subject to the same PIM operation to be stored relatively close to one another, such as at adjacent rows or at the same memory bank). Further, address hashing may also be selectively enabled for other scenarios, such as for data that does not utilize PIM operations. In such examples, performance of the memory device may be improved using address hashing (e.g., by enhancing bandwidth utilization, parallelism, and throughput while reducing contention and latency that may be associated with the memory device).

The detailed description set forth below, in connection with the appended drawings to which the text references, is intended as a description of various embodiments and is not intended to limit the scope of the disclosure. Rather, the detailed description includes specific details for the purpose of providing a thorough understanding of the subject matter of this disclosure. It will be apparent to those skilled in the art that these specific details are not required in every case and that, in some instances, well-known structures and components are shown in block diagram form for clarity of presentation.

In the description of embodiments herein, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

FIG. 1 is a block diagram illustrating an example of a system-on-chip (SoC) 100 that supports PIM-aware address hashing. The SoC 100 may include several components coupled together through a bus 102, which may be a network-on-a-chip (NoC) or a plurality of NoCs interconnecting various components. For example, although FIG. 1 illustrates several components coupled to the bus 102, the several components may be coupled to different busses with additional busses connecting the different busses to provide a path for communication between the components.

One example component in the SoC 100 is a digital signal processor 112 for signal processing. The DSP 112 may process audio signals received from microphones 130A, 130B, and 130C of microphone array 130. The DSP 112 may include hardware customized for performing a limited set of operations on specific kinds of data. For example, a DSP may include transistors coupled together to perform operations on streaming data and use memory architectures and/or access techniques to fetch multiple data or instructions concurrently. Such configurations may allow the DSP 112 to operate on real-time data, such as video data, audio data, or modem data, in a power-efficient manner.

The SoC 100 also includes a central processing unit (CPU) 104 and a memory 106 storing instructions 108 (e.g., a memory storing processor-readable code or a non-transitory computer-readable medium storing instructions) that may be executed by a processor of the SoC 100. The CPU 104 may be a single central processing unit (CPU) or a CPU cluster comprising two or more cores such as core 104A. The CPU 104 may include hardware capable of performing generic operations on many kinds of data, such as hardware capable of executing instructions from the Advanced RISC Machines (ARM®) instruction set, such as ARMv8 and ARMv9. For example, a CPU 104 may include transistors coupled together to perform operations for supporting executing an operating system and user applications (e.g., a camera application, a multimedia application, a gaming application, a productivity application, a messaging application, a videocall application, an audio recording application, a video recording application). The CPU 104 may execute instructions 108 retrieved from the memory 106. In some embodiments, the CPU 104 executing an operating system may coordinate execution of instructions by various components within the SoC 100. For example, the CPU 104 may retrieve instructions 108 from memory 106 and execute the instructions on the DSP 112.

The SoC 100 may further include a neural signal processor (NSP) 124 for executing machine learning (ML) models relating to multimedia applications. The NSP 124 may include hardware configured to perform and accelerate convolution operations involved in executing machine learning algorithms. For example, the NSP 124 may improve performance when executing predictive models such as artificial neural networks (ANNs) (including multilayer feedforward neural networks (MLFFNN), the recurrent neural networks (RNN), and/or the radial basis functions (RBF)). The ANN executed by the NSP 124 may access predefined training weights stored in the memory 106 for performing operations on user data.

The SoC 100 may be coupled to a display 114 for interacting with a user. The SoC 100 may also include a graphics processing unit (GPU) 126 for rendering images on the display 114. In some embodiments, the CPU 104 may perform rendering to the display 114 without a GPU 126. In some embodiments, the GPU 126 may be configured to execute instructions for performing operations unrelated to rendering images, such as for processing large volumes of datasets in parallel.

Input/output components may be coupled to the SoC 100 through an input/output (I/O) hub 116. An example of a hub 116 is an interconnect to a peripheral component interconnect express (PCIe) bus. Example components coupled to hub 116 may be components used for interacting with a user, such as a touch screen interface and/or physical buttons. Some components coupled to hub 116 may also include network interfaces for communicating with other devices, including a wide area network (WAN) adaptor (e.g., WAN adaptor 152), a local area network (LAN) adaptor (e.g., LAN adaptor 153), and/or a personal area network (PAN) adaptor (e.g., PAN adaptor 154). A WAN adaptor 152 may be a 4G LTE or a 5G NR wireless network adaptor. A LAN adaptor 153 may be an IEEE 802.11 WiFi wireless network adapter. A PAN adaptor 154 may be a Bluetooth wireless network adaptor. Each of the WAN adaptor 152, LAN adaptor 153, and/or PAN adaptor 154 may be coupled to an antenna that may be shared by each of the adaptors 152, 153, and 154, or coupled to multiple antennas configured for primary and diversity reception and/or configured for receiving specific frequency bands. In some embodiments, the WAN adaptor 152, LAN adaptor 153, and/or PAN adaptor 154 may share circuitry, such as portions of a radio frequency front end (RFFE).

Audio circuitry 156 may be integrated in SoC 100 as dedicated circuitry for coupling the SoC 100 to a speaker 120 external to the SoC 100, which may be a transducer such as a speaker (either internal to or external to a device incorporating the SoC 100) or headphones. The audio circuitry 156 may include coder/decoder (CODEC) functionality for processing digital audio signals. The audio circuitry 156 may further include one or more amplifiers (e.g., a class-D amplifier) for driving a transducer coupled to the SoC 100 for outputting sounds generated during execution of applications by the SoC 100. Functionality related to audio signals described herein may be performed by a combination of the audio circuitry 156 and/or other processors of the SoC (e.g., CPU 104, DSP 112, GPU 126, NSP 124).

The SoC 100 may couple to external devices outside the package of the SoC 100. For example, the SoC 100 may be coupled to a power supply 118, such as a battery or an adaptor to couple the SoC 100 to an energy source. The signal processing described herein may be adapted to and achieve power efficiency to support operation of the SoC 100 from a limited-capacity power supply 118 such as a battery. For example, operations may be performed on a portion of the SoC 100 configured for performing the operation at a lowest power consumption. As another example, operations themselves are performed in a manner that reduces an amount of computations to perform the operation, such that the algorithm is optimized for extending the operational time of a device while powered by a limited-capacity power supply 118. In some embodiments, the operations described herein may be configured based on a type of power supply 118 providing energy to the SoC 100. For example, a first set of operations may be executed to perform a function when the power supply 118 is a wall adaptor. As another example, a second set of operations may be executed to perform a function when the power supply 118 is a battery.

The SoC 100 may also include or be coupled to additional features or components that are not shown in FIG. 1. Although components are shown integrated as a single SoC 100, which may include all components built on a single semiconductor die with a common semiconductor substrate, other arrangements of the illustrated blocks different number of dies, substrates, and/or packages may be arranged to accomplish the same functionality described in this disclosure.

The memory 106 may include a non-transient or non-transitory computer readable medium storing computer-executable instructions as instructions 108 to perform all or a portion of one or more operations described in this disclosure. The instructions 108 may include a multimedia application (or other suitable application such as a messaging application) to be executed by the SoC 100 that records, processes, or outputs audio signals. The instructions 108 may also include other applications or programs executed by the SoC 100, such as an operating system and applications other than for multimedia processing.

In addition to instructions 108, the memory 106 may also store audio data. The SoC 100 may be coupled to an external memory and configured to access the memory for writing output audio files for later playback or long-term storage. For example, the SoC 100 may be coupled to a flash storage device comprising NAND memory for storing video files (e.g., MP4-container formatted files) including audio tracks and/or storing audio recordings (e.g., MPEG-1 Layer 3 files, also referred to as MP3 files). Portions of the video or audio files may be transferred to memory 106 for processing by the SoC 100, with the resulting signals after processing encoded as video or audio files in the memory 106 for transfer to the long-term storage.

While the SoC 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the SoC 100.

The SoC 100 of FIG. 1 may obtain improved device operation and/or improved user experience by performing process-in-memory (PIM)-aware address hashing in connection with one or more memory devices. In some examples, the one or more memory devices may include a memory that is external to the SoC 100, such as a memory 158. In some implementations, the memory 158 may be coupled (e.g., via the bus 102) to one or more components of the SoC 100, such as one or more of the CPU 104, the DSP 112, the NSP 124, or the GPU 126, as illustrative examples. In some examples, the memory 158 may include or may correspond to a dynamic random access memory (DRAM). Alternatively or in addition to the memory 158, the one or more memory devices may include one or more other memories, such as the memory 106. One example integration of some aspects of this disclosure into a wireless device are shown in FIG. 2 and described below.

Figure 2:
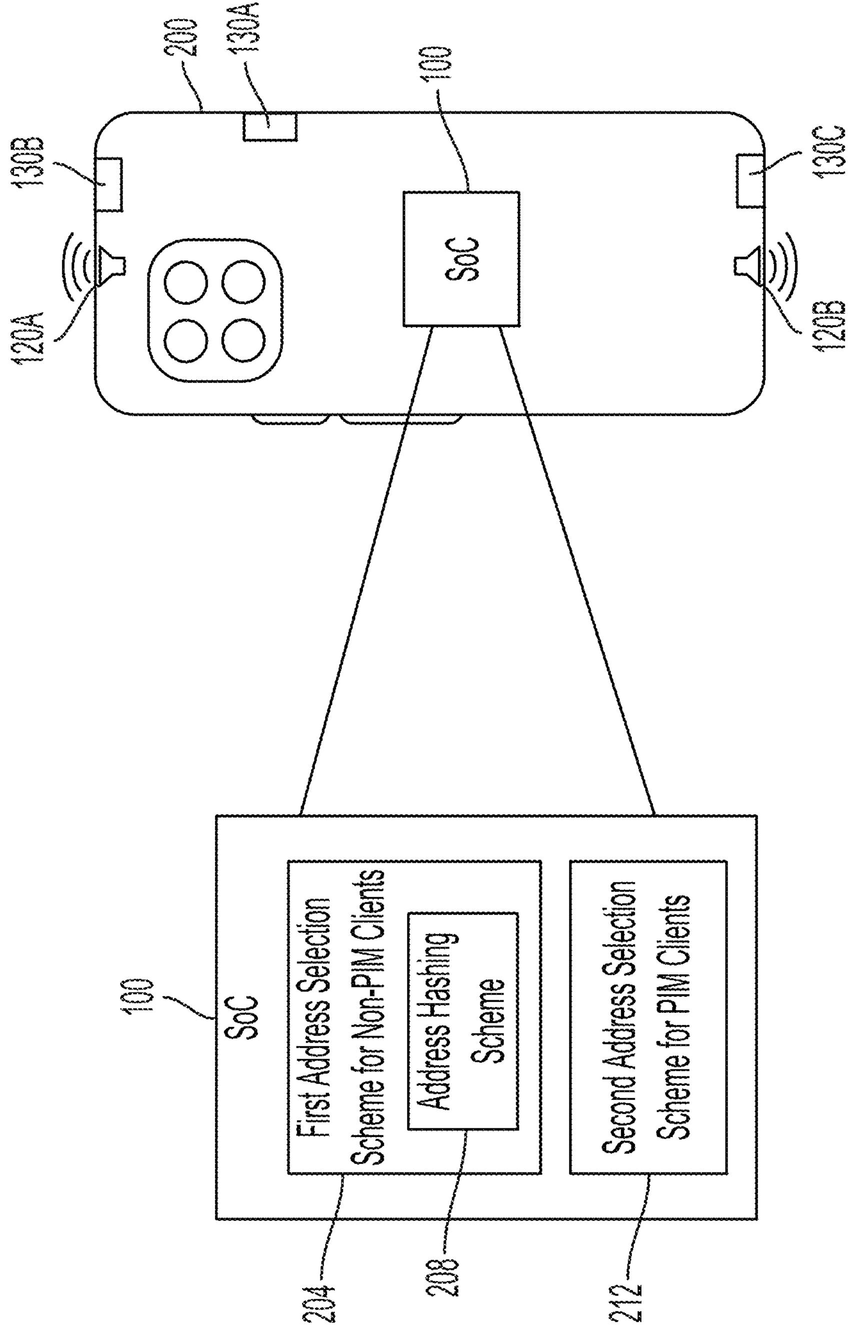
FIG. 2 is a block diagram illustrating an example of a wireless device that supports PIM-aware address hashing.

FIG. 2 is a block diagram illustrating an example of a wireless device 200 that supports PIM-aware address hashing. The wireless device 200 may include the SoC 100 of FIG. 1. In the example of FIG. 2, the SoC 100 may use multiple address selection schemes, which may include a first address selection scheme 204 for non-PIM clients and a second address selection scheme 212 for PIM clients. In some examples, the first address selection scheme 204 may include or may correspond to an address hashing scheme 208, and the second address selection scheme 212 may exclude the address hashing scheme 208.

As referred to herein, "client" may refer to a hardware component (such as a processor), a set of instructions executed by a processor (such as program or application executed by a processor), or a combination thereof. To further illustrate, in some examples, a client may include one or more of the CPU 104, the DSP 112, the NSP 124, or the GPU 126. In some other examples, a client may include a set of instructions executed by the CPU 104, the DSP 112, the NSP 124, or the GPU 126. In some examples, a single hardware component may execute multiple clients, such as where the CPU 104, the DSP 112, the NSP 124, or the GPU 126 executes multiple sets of instructions each corresponding to a respective client.

In addition, as referred to herein, "PIM client" may refer to a client utilizing PIM operations of a memory. As referred to herein, "non-PIM client" may refer to a client performing operations at a memory without utilizing PIM operations of the memory. To illustrate, in some examples, a client may be referred to as a PIM client while the client is utilizing PIM operations and may be referred to as a non-PIM client while the client is performing operations at a memory without utilizing PIM operations of the memory.

Although the example of FIG. 2 illustrates that the SoC 100 may be included in the wireless device 200, other examples are also within the scope of the disclosure. For example, in some implementations, one or more features described herein (such as one or more features of the SoC 100) may be implemented in another type of computing device (e.g., one or more of a desktop computer, a laptop computer, a tablet computer, or a server), a vehicle, or an Internet-of-Things (IoT) sensor. Other examples are also within the scope of the disclosure.

Figure 3:
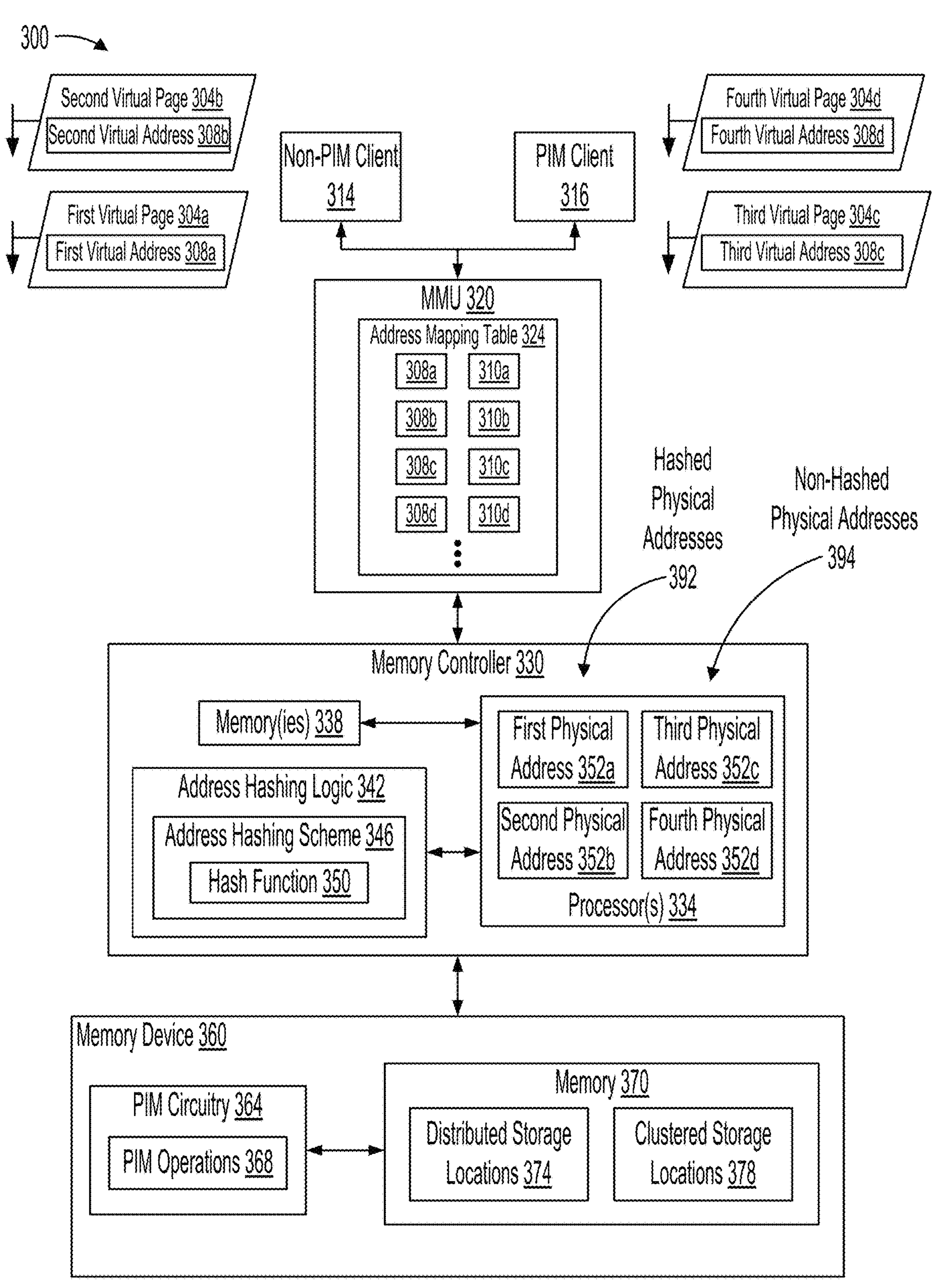
FIG. 3 is a block diagram illustrating an example of a system that supports PIM-aware address hashing.

FIG. 3 is a block diagram illustrating an example of a system 300 that supports PIM-aware address hashing. The system 300 may include or may be coupled to one or more first clients, such as a non-PIM client 314, and one or more second clients, such as a PIM client 316. The non-PIM client 314 and the PIM client 316 may be coupled to an MMU 320. The MMU 320 may be coupled to a memory controller 330, and the memory controller 330 may be coupled to a memory device 360 (e.g., one or more memory dies). In some examples, the memory device 360 may include or may correspond to the memory 106, the memory 158, or another memory.

In some examples, the memory controller 330 may include a processing system including one or more processors 334 and one or more memories 338 coupled to the one or more processors 334. The memory controller 330 may further include address hashing logic 342. In some implementations, the address hashing logic 342 may include one or more of circuitry or instructions. The instructions may be executed by the one or more processors 334 and stored at the one or more memories 338. In some implementations, the address hashing logic 342 may include circuitry coupled to the one or more processors 334 and the one or more memories 338. The address hashing logic 342 may operate in accordance with an address hashing scheme 346 (e.g., the address hashing scheme 208 of FIG. 2). The address hashing scheme 346 may utilize one or more hash functions, such as a hash function 350.

The memory device 360 may include PIM circuitry 364 and a memory 370. The memory 370 may be coupled to the PIM circuitry 364. In some examples, the PIM circuitry 364 may include multiply-and-accumulate (MAC) circuitry. The memory 370 may include storage locations, such as distributed storage locations 374 and clustered storage locations 378. In some examples, the distributed storage locations 374 may include non-adjacent storage locations of the memory 370, storage locations of multiple different banks of the memory 370, or both. In some examples, the clustered storage locations 378 may include adjacent storage locations of the memory 370, storage locations that are within a common bank of the memory 370, or both.

In some examples, the system 300 may include the SoC 100, or one or more components of the system 300 may be included in the SoC 100 of FIG. 1. In some examples, the non-PIM client 314 and the PIM client 316 may correspond to features of the SoC 100. For example, the non-PIM client 314 may correspond to one of the CPU 104, the DSP 112, the NSP 124, or the GPU 126, and the PIM client 316 may correspond to another of the CPU 104, the DSP 112, the NSP 124, or the GPU 126. In some other examples, non-PIM client 314 and the PIM client 316 may correspond to programs or applications executed by one or more processors, such as any of the CPU 104, the DSP 112, the NSP 124, or the GPU 126. Further, the MMU 320 and the memory controller 330 may be included in the SoC 100. For example, the MMU 320 and the memory controller 330 may be coupled to the bus 102. In some examples, the memory device 360 may include or may correspond to the memory 106, the memory 158, or another memory.

During operation, the MMU 320 may receive data to be stored to the memory device 360. For example, the MMU 320 may receive first data (e.g., a first virtual page 304*a*), second data (e.g., a second virtual page 304*b*), third data (e.g., a third virtual page 304*c*), and fourth data (e.g., a fourth virtual page 304*d*). In some examples, the first virtual page 304*a* and the second virtual page 304*b* may be associated with (e.g., may be received from) one or more first clients that do not utilize PIM operations 368 by the memory device 360 (e.g., the non-PIM client 314). The third virtual page 304*c* and the fourth virtual page 304*d* may be associated with (e.g., may be received from) one or more second clients that utilize the PIM operations 368 (e.g., the PIM client 316). The virtual pages 304*a*, 304*b*, 304*c*, and 304*d* and be associated with a first virtual address 308*a*, a second virtual address 308*b*, a third virtual address 308*c*, and a fourth virtual address 308*d*, respectively.

In some examples, the virtual pages 304*a-b* may be associated with a first application type, and the virtual pages 304*c-d* may be associated with a second application type different than the first application type. For example, the second application type may be an artificial intelligence (AI) application type or a large language model (LLM) application type, and the first application type may be a non-AI application type or a non-LLM application type.

The MMU 320 may perform address mapping operations associated with the virtual pages 304*a-d*. For example, the MMU 320 may use an address mapping table 324 to translate the virtual addresses 308*a*, 308*b*, 308*c*, and 308*d* to a first physical address 310*a*, a second physical address 310*b*, a third physical address 310*c*, and a fourth physical address 310*d*, respectively. In such examples, the address mapping table 324 may indicate that the virtual addresses 308*a*, 308*b*, 308*c*, and 308*d* are associated with the physical addresses 310*a*, 310*b*, 310*c*, and 310*d*, respectively. The physical addresses 310*a-d* may correspond to respective storage locations of the memory 370.

The MMU 320 may provide the virtual pages 304*a-d* to the memory controller 330 with the physical addresses 310*a-d*. In some aspects of the disclosure, the memory controller 330 may use the address hashing logic 342 to hash at least some physical addresses provided by the MMU 320, such as by hashing physical addresses associated with non-PIM clients (e.g., the non-PIM client 314) to generate hashed physical addresses 392. For example, the address hashing logic 342 may use the hash function 350 of the address hashing scheme 346 to generate a first physical address 352*a* based on the first physical address 310*a*. As another example, the address hashing logic 342 may use the hash function 350 of the address hashing scheme 346 to generate a second physical address 352*b* based on the second physical address 310*b*. In these examples, the physical addresses 352*a-b* may be included in, or may be referred to as, the hashed physical addresses 392.

To further illustrate, in some implementations, the hash function 350 may include an exclusive-OR (XOR) function. In such examples, the address hashing scheme 346 may specify that at least some bits of a physical address are to be XORed with one another to generate a hashed physical address. Other examples are also within the scope of the disclosure. For example, alternatively or in addition to an XOR operation, the address hashing scheme 346 may include one or more bit flipping operations, one or more bit permuting operations, one or more other operations, or a combination thereof.

In some aspects of the disclosure, the memory controller 330 may avoid hashing, or may reverse hash, at least some physical addresses provided by the MMU 320 to generate non-hashed physical addresses 394 that may be associated with PIM clients, such as the PIM client 316. In some examples, by using the non-hashed physical addresses 394, data may be more "clustered" in the memory 370. As a result, PIM operations may be performed more efficiently for PIM clients, such as the PIM client 316 (e.g., by enabling different virtual pages subject to the same PIM operation to be stored relatively close to one another, such as at adjacent rows or at the same memory bank). As a result, latency for PIM clients may be reduced by using non-hashed physical addresses (such as the non-hashed physical addresses 394). As referred to herein, "non-hashed physical address" may refer to a physical address that is not subject to the address hashing scheme 346 as well as a reverse-hashed physical address that is hashed twice (e.g., to "undo" effects of the address hashing scheme 346).

To illustrate, the memory controller 330 may determine a third physical address 352*c* associated with the third virtual page 304*c* and may also determine a fourth physical address 352*d* associated with the fourth virtual page 304*d*. In some implementations, to determine the third physical address 352*c*, the memory controller 330 may avoid hashing the third physical address 310*c* provided by the MMU 320 with the third virtual page 304*c*. In such examples, the third physical address 352*c* may correspond to (or may be the same as) the third physical address 310*c*. Similarly, to determine the fourth physical address 352*d*, the memory controller 330 may avoid hashing the fourth physical address 310*d* provided by the MMU 320 with the fourth virtual page 304*d*. In such examples, the fourth physical address 352*d* may correspond to (or may be the same as) the fourth physical address 310*d*. Some further examples are described further with reference to FIGS. 4, 5A, and 5B.

In some other implementations, the virtual addresses 308*c-d* may be "pre-hashed" (e.g., by the PIM client 316), and the memory controller 330 may reverse-hash the virtual addresses 308*c-d* using the address hashing logic 342 to generate the third physical address 352*c* and the fourth physical address 352*d*. Some further examples are described further with reference to FIGS. 6, 7A, and 7B.

The memory controller 330 may send the virtual pages 304*a-d* to the memory device 360 to be stored to the memory 370. Based on the virtual pages 304*a-b* being associated with the non-PIM client 314, the memory device 360 may store the virtual pages 304*a-b* to first storage locations of the memory 370 without performing the PIM operations 368. Further, because the physical addresses 352*a-b* of the virtual pages 304*a-b* are determined based on the hash function 350, the first storage locations corresponding to the physical addresses 352*a-b* may be distributed (also referred to as non-clustered). In some examples, the first storage locations may correspond to the distributed storage locations 374, and the virtual pages 304*a-b* may be stored to the distributed storage locations 374.

The memory device 360 may process the virtual pages 304*c-d* using the PIM operations 368 based on the virtual pages 304*c-d* being associated with the PIM client 316. Performing the PIM operations 368 may include, for example, multiply-and-accumulate (MAC) operations. The MAC operations may include multiplying a matrix and a vector to generate an accumulated result.

After processing the virtual pages 304*c-d* using the PIM operations 368, the memory device 360 may store the virtual pages 304*c-d* (or processed results associated with the virtual pages 304*c-d*) to second storage locations of the memory 370. Further, because the physical addresses 352*c-d* may be non-hashed, the second storage locations of the memory 370 may be clustered. In some examples, the second storage locations may correspond to the clustered storage locations 378, and the virtual pages 304*c-d* may be stored to the clustered storage locations 378.

In some examples, the memory controller 330 may select the distributed storage locations 374 in accordance with the address hashing scheme 346 (e.g., by hashing the physical addresses 310*a-b* to generate the physical addresses 352*a-b*). Further, the clustered storage locations 378 may be unassociated with the address hashing scheme 346 (e.g., where the memory controller 330 avoids hashing, or by reverse-hashes, the physical addresses 310*c-d*). To further illustrate, the distributed storage locations 374 may be associated with a first quantity of rows (or a first distance) separating one another (e.g., a first quantity of rows between the distributed storage locations 374), and the clustered storage locations 378 may be associated with a second quantity of rows (or a second distance) separating one another (e.g., a second quantity of rows between the clustered storage locations 378). The second distance may be less than the first distance (e.g., where the second quantity of rows is less than the first quantity of rows). In some examples, the first quantity may be greater than zero (e.g., where the distributed storage locations 374 may be non-adjacent to one another), and the second quantity may be zero (e.g., where the clustered storage locations 378 may be adjacent to one another).

Alternatively, or in addition, the distributed storage locations 374 may be associated with a first quantity of banks of the memory 370, and the clustered storage locations 378 may be associated with a second quantity of banks of the memory 370. In some examples, the second quantity may correspond to one, and the first quantity may be greater than one.

Although some examples herein may be described with reference to data (such as the virtual pages 304*a-d*), other examples are also within the scope of the disclosure. For example, in some implementations, address hashing may be selectively enabled and disabled for other types of requests (in addition to data read and data write requests).

Examples of such requests may include commands that do not include data, such as PIM-processing commands.

Figure 4:
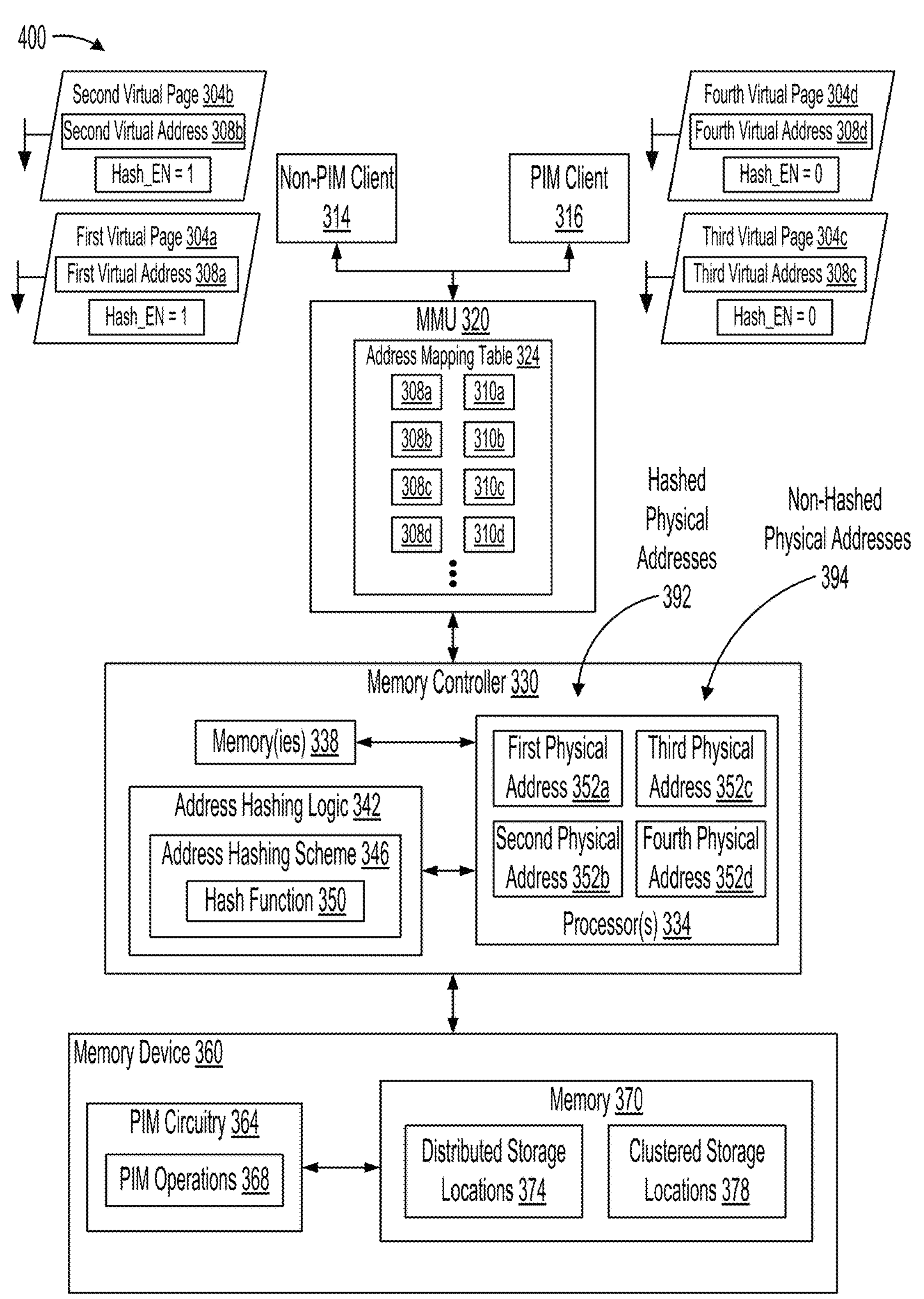
FIG. 4 is a block diagram illustrating an example of a system that supports PIM-aware address hashing.

FIG. 4 is a block diagram illustrating an example of a system 400 that supports PIM-aware address hashing. The system 400 may include one or more features of FIG. 3, such as one or more of the non-PIM client 314, the PIM client 316, the MMU 320, the memory controller 330, or the memory device 360.

In the example of FIG. 4, a hash enable attribute ("Hash_EN") may be used to indicate whether the address hashing scheme 346 is enabled or disabled for one or more virtual pages. To illustrate, in FIG. 4, each of the virtual pages 304*a-d* may include a respective value of the hash enable attribute indicating whether the address hashing scheme 346 is enabled or disabled for the respective virtual page. In some examples, the hash enable attribute may be set to a first value (e.g., Hash_EN=1) may be included with the virtual pages 304*a-b* to indicate that the address hashing scheme 346 is enabled for the virtual pages 304*a-b*. Further, in some examples, the hash enable attribute may be set to a second value (e.g., Hash_EN=0) may be included with the virtual pages 304*c-d* to indicate that the address hashing scheme 346 is disabled for the virtual pages 304*c-d*.

In some examples, the non-PIM client 314 and the PIM client 316 may provide the values of the hash enable attribute to the MMU 320. In such examples, the MMU 320 may provide (e.g., may forward) the hash enable attribute (or another indication) to the memory controller 330. Other examples are also within the scope of the disclosure. To illustrate, in some other examples, the MMU 320 may determine a value of the hash enable attribute based on the source of a virtual page (e.g., based on whether the virtual page is received from the non-PIM client 314 or the PIM client 316). In such examples, the MMU 320 may set the value of the hash enable attribute without an explicit indication of the value of the hash enable attribute from a client. In some examples, the MMU 320 may store a hash enable attribute as part of an MMU page property and may use the MMU page property in one or more operations (such as to identify a misuse error).

The memory controller 330 may receive, from the MMU 320, the virtual pages 304*a-d*, the virtual addresses 308*a-d*, and a respective hash enable attribute for each of the virtual pages 304*a-d*. The memory controller 330 may selectively enable or disable the address hashing scheme 346 based on each value of the hash enable attribute. For example, the memory controller 330 may determine, based on a first value of the hash enable attribute (e.g., Hash_EN=1), that the address hashing scheme 346 is enabled for the virtual pages 304*a-b*. As another example, the memory controller 330 may determine, based on a second value of the hash enable attribute (e.g., Hash_EN=0), that the address hashing scheme 346 is disabled for the virtual pages 304*c-d*. Accordingly, in some implementations, the hash enable attribute may be used to indicate whether the address hashing scheme 346 is enabled or disabled for a virtual page.

Figures 5A, 5B:
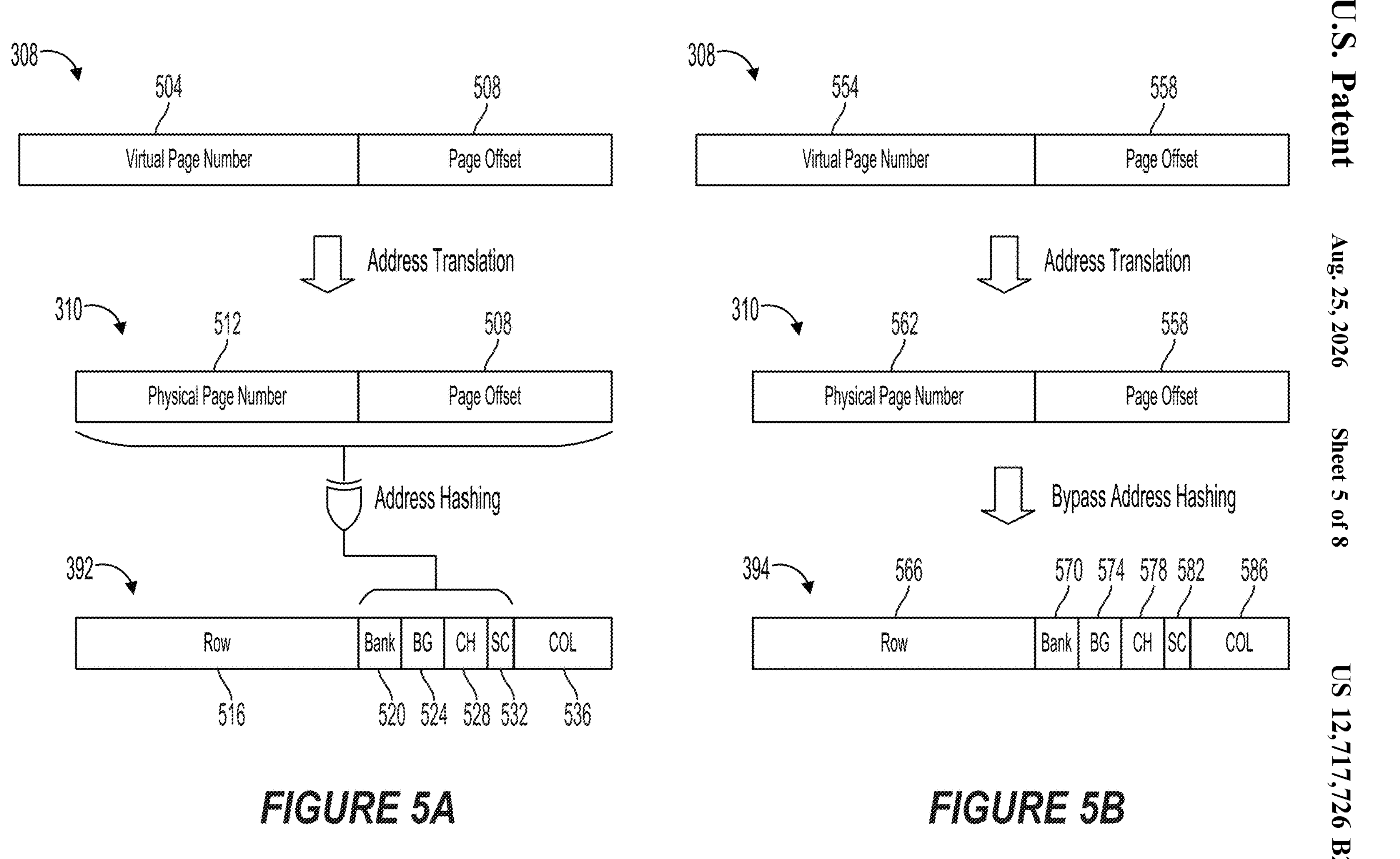
FIG. 5A is a block diagram illustrating an example of a process that supports PIM-aware address hashing.
FIG. 5B is a block diagram illustrating an example of a process that supports PIM-aware address hashing.

FIG. 5A is a block diagram illustrating an example of a process that supports PIM-aware address hashing. In some examples, the process of FIG. 5A may be performed by the system 400 of FIG. 4. For example, the process of FIG. 5A may be performed by the MMU 320 and the memory controller 330 based on the hash enable attribute (Hash_EN) of FIG. 4.

In the process of FIG. 5A, a virtual address 308 may include a virtual page number 504 and a page offset 508. In some examples, the virtual address 308 may correspond to one of the virtual addresses 308*a-b*. The process may include performing address translation (e.g., by the MMU 320 using the address mapping table 324) to determine a physical address 310. In some examples, the physical address 310 may include one of the physical addresses 310*a-b*. The physical address 310 may include a physical page number 512 and the page offset 508.

The process of FIG. 5A may further include address hashing the physical address 310 (e.g., in accordance with the address hashing scheme 346 and using the hash function 350) to determine a hashed physical address 392. The hashed physical address 392 may include a row address 516, a bank address 520, a bank group (BG) 524, a channel (CH) 528, a subchannel (SC) 532, and a column address (COL) 536. In some examples, the address hashing may include performing an XOR operation based on each bit of the physical address 310 to determine the bank address 520, the BG 524, the CH 528, and the SC 532. Alternatively, or in addition, the address hashing may include one or more other operations.

FIG. 5B is a block diagram illustrating an example of a process that supports PIM-aware address hashing. In some examples, the process of FIG. 5B may be performed by the system 400 of FIG. 4. For example, the process of FIG. 5B may be performed by the MMU 320 and the memory controller 330 based on the hash enable attribute (Hash_EN) of FIG. 4.

In the process of FIG. 5B, a virtual address 308 may include a virtual page number 554 and a page offset 558. In some examples, the virtual address 308 may correspond to one of the virtual addresses 308*c-d*. The process may include performing address translation (e.g., by the MMU 320 using the address mapping table 324) to determine a physical address 310. In some examples, the physical address 310 may correspond to one of the physical addresses 310*c-d*. The physical address 310 may include a physical page number 562 and the page offset 558.

The process of FIG. 5B may further include bypassing address hashing the physical address 310 to determine a non-hashed physical address 394. The non-hashed physical address 394 may correspond to the physical address 310. As illustrated in the example of FIG. 5B, the non-hashed physical address 394 may include a row address 566, a bank address 570, a BG 574, a CH 578, an SC 582, and a COL 586.

Figure 6:
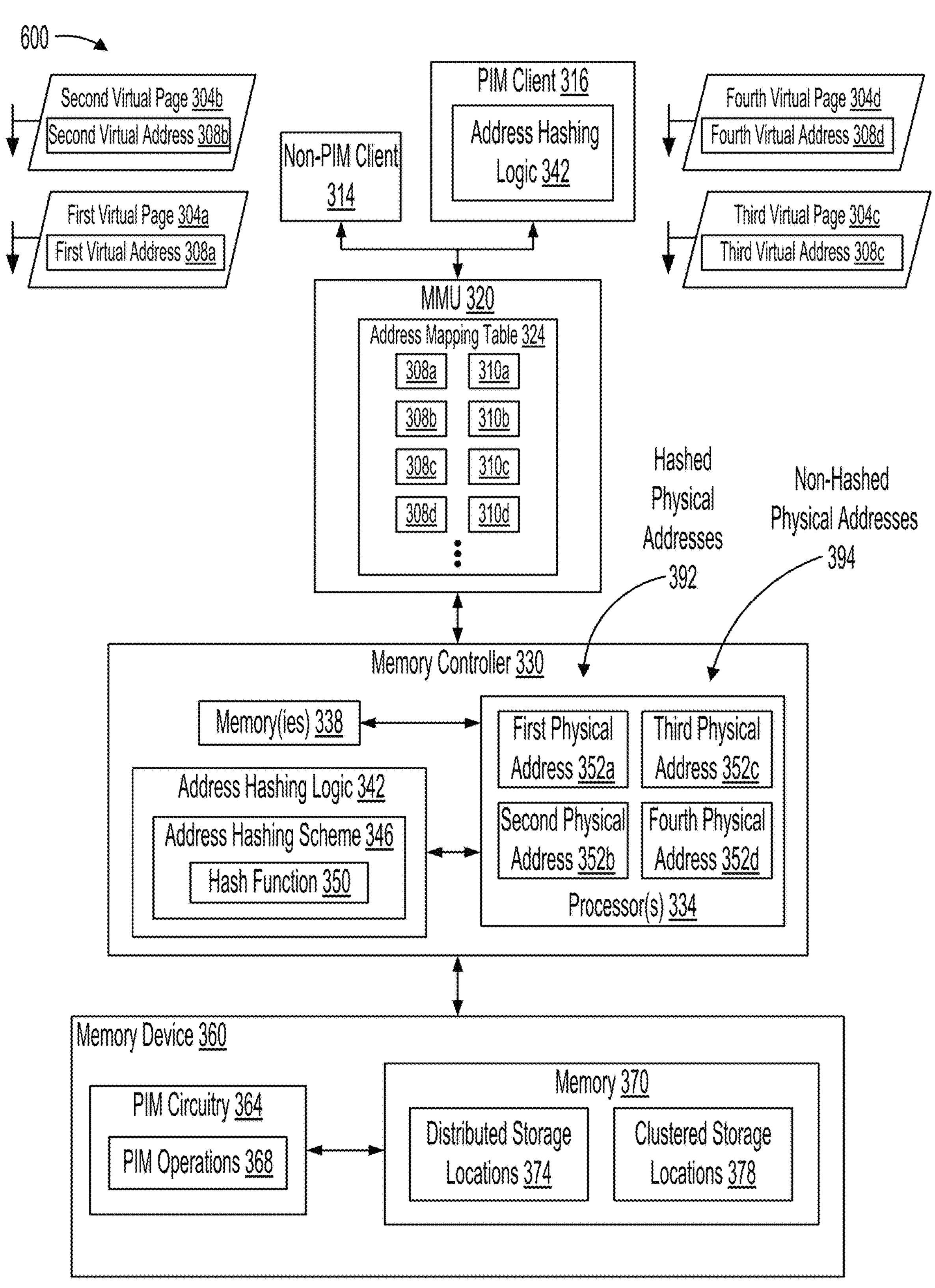
FIG. 6 is a block diagram illustrating an example of a system that supports PIM-aware address hashing.

FIG. 6 is a block diagram illustrating an example of a system 600 that supports PIM-aware address hashing. The system 600 may include one or more features of FIG. 3, such as one or more of the non-PIM client 314, the PIM client 316, the MMU 320, the memory controller 330, or the memory device 360.

In the example of FIG. 6, the PIM client 316 may include or may execute address hashing logic, such as the address hashing logic 342. The address hashing logic 342 of the PIM client 316 may be configured to operate in accordance with the address hashing scheme 346. For example, the address hashing logic 342 of the PIM client 316 may be configured to pre-hashed data in accordance with the hash function 350 associated with the address hashing scheme 346.

During operation, the PIM client 316 may use the address hashing logic 342 to hash (or "pre-hash") one or more virtual addresses (or portions of virtual addresses) of data to be stored to the memory devices 360. For example, the PIM client 316 may use the address hashing logic 342 to hash at least a portion of the third virtual address 308*c*. As another example, the PIM client 316 may use the address hashing logic 342 to hash at least a portion of the fourth virtual address 308*d*. In such examples, virtual addresses 308*c-d* may correspond to (or may be referred to as) pre-hashed virtual addresses that include at least some bits that are pre-hashed in accordance with the hash function 350 associated with the address hashing scheme 346.

The MMU 320 may receive the virtual pages 304*a-d* and the virtual addresses 308*a-d*. The MMU 320 may perform address mapping (e.g., using the address mapping table 324) to determine the physical addresses 310*a-d*. The physical addresses 310*c-d* may correspond to (or may be referred to as) pre-hashed physical addresses that include at least some bits that are pre-hashed in accordance with the hash function 350. The MMU 320 may provide the physical addresses 310*a-d* with the virtual pages 304*a-d* to the memory controller 330.

The memory controller 330 may receive the virtual pages 304*a-d* with the physical addresses 310*a-d* from the MMU 320. The memory controller 330 may determine the first physical address 352*a* based on the hash function 350 (e.g., by hashing the first physical address 310*a* using the hash function 350). The memory controller 330 may also determine the second physical address 352*b* based on the hash function 350 (e.g., by hashing the second physical address 310*b* using the hash function 350). In such examples, the first physical address 352*a* may correspond to (or may be referred as) a first forward-hashed version of the first virtual address 308*a* and the first physical address 310*a*, and the second physical address 352*b* may correspond to (or may be referred to as) a second forward-hashed version of the second virtual address 308*b* and the second physical address 310*b*.

The memory controller 330 may determine the third physical address 352*c* based on the hash function 350 (e.g., by hashing the third physical address 310*c* using the hash function 350). The memory controller 330 may also determine the fourth physical address 352*d* based on the hash function 350 (e.g., by hashing the fourth physical address 310*d* using the hash function 350). As described above, the physical addresses 310*c-d* may correspond to (or may be referred to as) pre-hashed physical addresses that include at least some bits that are pre-hashed in accordance with the hash function 350. By hashing such bits of the physical addresses 310*c-d* again based on the hash function 350 to generate the physical addresses 352*c-d*, the memory controller 330 may "undo" effects of the address hashing scheme 346. Accordingly, the third physical address 352*c* may correspond to (or may be referred as) a first reverse-hashed version of the third virtual address 308*c* and the third physical address 310*c*, and the fourth physical address 352*d* may correspond to (or may be referred to as) a second reverse-hashed version of the fourth virtual address 308*d* and the fourth physical address 310*d*.

Accordingly, in the example of FIG. 6, the system 600 may use pre-hashing and reverse-hashing to generate the non-hashed physical addresses 394. In some implementations, the third virtual address 308*c* and the fourth virtual address 308*d* include respective address offsets. In such examples, the memory controller 330 may apply the hash function 350 to the address offsets (e.g., without applying the hash function to at least one other address portion) to determine the third physical address 352*c* and the fourth physical address 352*d*. In some examples, the at least one other address portion may include a physical page number. Some further examples are described further with reference to FIGS. 7A and 7B.

Figures 7A, 7B:
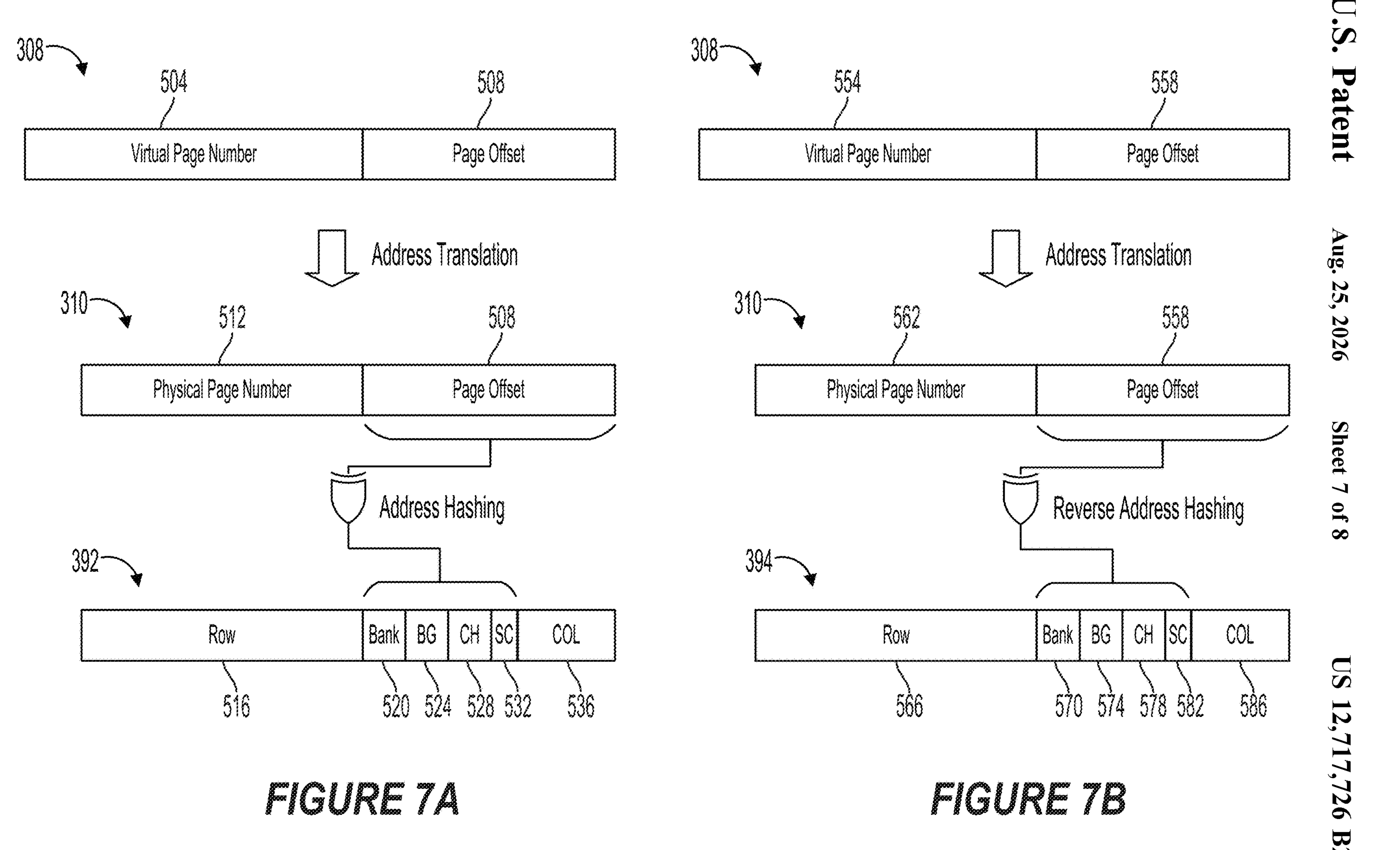
FIG. 7A is a block diagram illustrating an example of a process that supports PIM-aware address hashing.
FIG. 7B is a block diagram illustrating an example of a process that supports PIM-aware address hashing.

FIG. 7A is a block diagram illustrating an example of a process that supports PIM-aware address hashing. In some examples, the process of FIG. 7A may be performed by the system 600 of FIG. 6. For example, the process of FIG. 7A may be performed by the MMU 320 and the memory controller 330 of FIG. 6.

The process of FIG. 7A may include performing address translation of the virtual address 308 to generate the physical address 310. The process may also include performing address hashing (e.g., using the hash function 350) based on at least a portion of the physical address 310 to generate the hashed physical address 392.

In the example of FIG. 7A, the address hashing may be performed based on a subset of the physical address 310, such as by performing the address hashing based on the page offset 508 and without using the physical page number 512. Other examples, such as the example of FIG. 5A, may perform address hashing using both the page offset 508 and the physical page number 512.

FIG. 7B is a block diagram illustrating an example of a process that supports PIM-aware address hashing. In some examples, the process of FIG. 7B may be performed by the system 600 of FIG. 6. For example, the process of FIG. 7B may be performed by the MMU 320 and the memory controller 330 of FIG. 6.

In the example of FIG. 7B, the page offset 558 may be pre-hashed (e.g., by the PIM client 316 using the address hashing logic 342). Accordingly, by reverse-hashing the page offset 558 to generate the non-hashed physical address 394, the memory controller 330 may "undo" effects of pre-hashing the page offset 558.

FIG. 8 is a flow chart illustrating an example of a method 800 that supports PIM-aware address hashing. In some examples, the method 800 may be performed by the memory controller 330.

The method 800 includes sending, to a memory device, a first request associated with a first physical address of the memory device, at 802. To illustrate, in some examples, the first request may correspond to a write command, a read command, or another command. The memory device may correspond to the memory device 360. The first physical address is in accordance with a first address selection scheme (e.g., the first address selection scheme 204) that includes an address hashing scheme (e.g., the address hashing scheme 208). In some examples, the first physical address may correspond to the first physical address 352*a* or the second physical address 352*b*.

The method 800 further includes sending, to the memory device, a second request associated with a second physical address of the memory device, at 804. In accordance with the second request being associated with process-in-memory (PIM) operations by the memory device (e.g., the PIM operations 368 by the memory device 360), the second physical address is in accordance with a second address selection scheme (e.g., the second address selection scheme 212) different than the first address selection scheme. To illustrate, in some examples, the second request may correspond to a write command, a read command, or another command. In some examples, the second physical address may correspond to the third physical address 352*c* or the fourth physical address 352*d*.

Although some features may be described herein with reference to write operations to the memory device 360, such features may also be utilized in connection with read operations from the memory device 360. To illustrate, in one example, the MMU 320 may receive (e.g., from the non-PIM client 314) a first read request for first read data, such as one or more of the first virtual page 304*a* or the second virtual page 304*b*. The MMU 320 may translate virtual addresses associated with the first read request and may forward the first read request to the memory controller 330. Based on the first read request, the memory controller 330 may access the first read data at the memory device 360. Further, accessing the first read data may include bypassing the PIM circuitry 364 of the memory device 360. The memory controller 330 may input the physical addresses 352*a-b* to the address hashing logic 342 to generate the physical addresses 310*a-b* (e.g., to "undo" effects of the address hashing scheme 346).

To further illustrate, the MMU 320 may receive (e.g., from the PIM client 316) a second read request for second read data, such as one or more of the third virtual page 304*c* or the fourth virtual page 304*d*. The MMU 320 may translate virtual addresses associated with the second read request and may forward the second read request to the memory controller 330. Based on the second read request, the memory controller 330 may access the second read data at the memory device. Further, accessing the second read data may include pre-processing the second read data using the PIM circuitry 364 of the memory device 360. In one example, the read data may include a particular value of the hash enable attribute of FIG. 4 (e.g., Hash_EN=0), and the memory controller 330 may avoid address hashing physical addresses associated with the second read data. In another example, the memory controller 330 may address hash a page offset associated with the physical addresses, and the PIM client 316 may reverse-hash the page offset.

A particular technique may be selected for a particular system from among the various examples herein based on the particular design of the system. For example, use of a hash enable attribute (e.g., as described in connection with one or more of FIGS. 4, 5A, and 5B) may enable relatively simple operation for clients, such as by using one bit to indicate whether address hashing is requested. Further, in some examples, use of a hash enable attribute may enable multiple clients to access the same page (irrespective of whether a client includes the address hashing logic 342). Other systems may use multiple hash operations (e.g., as described in connection with one or more of FIGS. 6, 7A, and 7B) to "offload" responsibility to clients (e.g., where a client is responsible for "pre-hashing" an address instead of indicating, via a hash enable attribute, that address hashing is to be disabled for the address). In such examples, impact on the MMU 320 and the memory controller 330 may be reduced. Other examples are also within the scope of the disclosure.

In some examples, virtual pages may need to meet a minimum page size if address hashing is to be disabled. To illustrate, virtual pages may need to meet the minimum page size to ensure that address hashing utilizes only bits of a page offset (and not bits of a physical page number). In this example, bank, BG, CH, SC, and COL bits may remain in the page offset and are not "misinterpreted" as belonging to the physical page number. In some examples, the minimum page size may correspond to two megabytes (MB). Other examples are also within the scope of the disclosure.

Although some examples may be described with reference to an example sequence for convenience of illustration, other sequences are also within the scope of the disclosure. For example, the virtual pages 304*a-d* may be received by the MMU 320 in any order.

One or more features described herein may improve performance of a system (e.g., any of the systems 300, 400, or 600) that includes or accesses a memory device (e.g., the memory device 360). For example, by selectively disabling the address hashing scheme 346 for data that uses the PIM operations 368, the data may be more "clustered" in the memory device 360 (e.g., where physical pages storing the data are relatively close together). As a result, the PIM operations 368 may be performed more efficiently (e.g., by enabling different virtual pages subject to the PIM operations 368 to be stored relatively close to one another, such as at adjacent rows or at the same memory bank). Further, the address hashing scheme 346 may also be selectively enabled for other scenarios, such as for data that does not utilize the PIM operations 368. In such examples, performance of the memory device 360 may be improved using the address hashing scheme 346 (e.g., by enhancing bandwidth utilization, parallelism, and throughput while reducing contention and latency that may be associated with the memory device 360).

In a first aspect, an apparatus includes a processing system including one or more memories and one or more processors coupled to the one or more memories. The processing system is configured to send, to a memory device, a first request associated with a first physical address of the memory device. The first physical address is in accordance with a first address selection scheme that includes an address hashing scheme. The processing system is further configured to send, to the memory device, a second request associated with a second physical address of the memory device. In accordance with the second request being associated with process-in-memory (PIM) operations by the memory device, the second physical address is in accordance with a second address selection scheme different than the first address selection scheme.

In a second aspect, in combination with the first aspect, the first physical address is associated with distributed storage locations of the memory device that are selected in accordance with the address hashing scheme, and the second physical address is associated with clustered storage locations of the memory device that are unassociated with the address hashing scheme.

In a third aspect, in combination with one or more of the first aspect or the second aspect, the first request is associated with one or more first clients that do not utilize the PIM operations by the memory device, and the second request is associated with one or more second clients that utilize the PIM operations by the memory device.

In a fourth aspect, in combination with one or more of the first aspect through the third aspect, the processing system is further configured to receive a hash enable attribute indicating whether the address hashing scheme is enabled or disabled for one or more of the first request or the second request.

In a fifth aspect, in combination with one or more of the first aspect through the fourth aspect, the processing system is further configured to determine, based on a first value of the hash enable attribute, that the address hashing scheme is enabled for the first request and to determine, based on a second value of the hash enable attribute, that the address hashing scheme is disabled for the second request.

In a sixth aspect, in combination with one or more of the first aspect through the fifth aspect, the processing system is further configured to receive the first request with a first virtual address and to receive the second request with a second virtual address that is pre-hashed in accordance with a hash function associated with the address hashing scheme.

In a seventh aspect, in combination with one or more of the first aspect through the sixth aspect, the processing system is further configured to determine the first physical address based on the hash function, where the first physical address corresponds to a forward-hashed version of the first virtual address, and to determine the second physical address further based on the hash function, where the second physical address corresponds to a reverse-hashed version of the second virtual address.

In an eighth aspect, in combination with one or more of the first aspect through the seventh aspect, the second virtual address includes an address offset, and the processing system is further configured to determine the second physical address by applying the hash function to the address offset without applying the hash function to at least one other address portion.

In a ninth aspect, a method of operation of a memory controller includes sending, to a memory device, a first request associated with a first physical address of the memory device. The first physical address is in accordance with a first address selection scheme that includes an address hashing scheme. The method further includes sending, to the memory device, a second request associated with a second physical address of the memory device. In accordance with the second request being associated with process-in-memory (PIM) operations by the memory device, the second physical address is in accordance with a second address selection scheme different than the first address selection scheme.

In a tenth aspect, in combination with the ninth aspect, the first physical address is associated with distributed storage locations of the memory device that are selected in accordance with the address hashing scheme, and the second physical address is associated with clustered storage locations of the memory device that are unassociated with the address hashing scheme.

In an eleventh aspect, in combination with one or more of the ninth aspect through the tenth aspect, the first request is associated with one or more first clients that do not utilize the PIM operations by the memory device, and the second request is associated with one or more second clients that utilize the PIM operations by the memory device.

In a twelfth aspect, in combination with one or more of the ninth aspect through the eleventh aspect, the method further includes receiving a hash enable attribute indicating whether the address hashing scheme is enabled or disabled for one or more of the first request or the second request.

In a thirteenth aspect, in combination with one or more of the ninth aspect through the twelfth aspect, the method further includes determining, based on a first value of the hash enable attribute, that the address hashing scheme is enabled for the first request. The method further includes determining, based on a second value of the hash enable attribute, that the address hashing scheme is disabled for the second request.

In a fourteenth aspect, in combination with one or more of the ninth aspect through the thirteenth aspect, the method further includes receiving the first request with a first virtual address and receiving the second request with a second virtual address that is pre-hashed in accordance with a hash function associated with the address hashing scheme.

In a fifteenth aspect, in combination with one or more of the ninth aspect through the fourteenth aspect, the method further includes determining the first physical address based on the hash function, where the first physical address corresponds to a forward-hashed version of the first virtual address, and further includes determining the second physical address further based on the hash function, where the second physical address corresponds to a reverse-hashed version of the second virtual address.

In a sixteenth aspect, in combination with one or more of the ninth aspect through the fifteenth aspect, the second virtual address includes an address offset, and determining the second physical address includes applying the hash function to the address offset without applying the hash function to at least one other address portion.

In a seventeenth aspect, a non-transitory computer-readable medium stores instructions executable by one or more processors to perform operations. The operations include sending, to a memory device, a first request associated with a first physical address of the memory device. The first physical address is in accordance with a first address selection scheme that includes an address hashing scheme. The operations further include sending, to the memory device, a second request associated with a second physical address of the memory device. In accordance with the second request being associated with process-in-memory (PIM) operations by the memory device, the second physical address is in accordance with a second address selection scheme different than the first address selection scheme.

In an eighteenth aspect, in combination with the seventeenth aspect, the first request is associated with one or more first clients that do not utilize the PIM operations by the memory device, and the second request is associated with one or more second clients that utilize the PIM operations by the memory device.

In a nineteenth aspect, in combination with one or more of the seventeenth aspect through the eighteenth aspect, the operations further include receiving a hash enable attribute indicating whether the address hashing scheme is enabled or disabled for one or more of the first request or the second request.

In a twentieth aspect, in combination with one or more of the seventeenth aspect through the nineteenth aspect, the operations further include receiving the first request with a first virtual address and receiving the second request with a second virtual address that is pre-hashed in accordance with a hash function associated with the address hashing scheme.

In the figures, a single block may be described as performing a function or functions: The function or functions performed by that block may be performed in a single component or across multiple components, and/or may be performed using hardware, software, or a combination of hardware and software. To illustrate, various illustrative components, blocks, modules, circuits, and operations may be described in terms of functionality.

Whether such functionality is implemented as hardware or software may depend upon the particular application and the overall system design. Skilled artisans may implement the described functionality in varying ways for each particular application, but such implementation decisions should not be interpreted as causing a departure from the scope of the disclosure. Also, the example devices may include components other than those shown, including components such as a processor, memory, and the like.

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (such as application specific integrated circuits (ASICs), digital signal processors (DSP), graphics processing unit (GPU), central processing unit (CPU), computer vision processor (CVP), or neural signal processor (NSP)) configured to perform the recited function through hardware, software, or a combination of hardware configured by software.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, functional blocks, and modules described herein may include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

In one or more aspects, the operations described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

The operations of a method or process disclosed herein may be implemented in a processor-executable software module which may reside on a computer-readable medium and commercially made available as a computer program product as software. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc, where disks usually reproduce data magnetically and discs reproduce data optically with lasers. Combinations of the above should also be included within the scope of computer-readable media.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, opposing terms such as "upper" and "lower," or "front" and back," or "top" and "bottom," or "forward" and "backward," or "left" and "right" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 5, 5, or 50 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus comprising:

a processing system comprising one or more memories and one or more processors coupled to the one or more memories, the processing system configured to:

send, to a memory device, a first request associated with a first physical address of the memory device, wherein the first physical address is in accordance with a first address selection scheme that includes an address hashing scheme; and send, to the memory device, a second request associated with a second physical address of the memory device, wherein, in accordance with the second request being associated with process-in-memory (PIM) operations by the memory device, the second physical address is in accordance with a second address selection scheme different than the first address selection scheme.

2. The apparatus of claim 1, wherein the first physical address is associated with distributed storage locations of the memory device that are selected in accordance with the address hashing scheme, and wherein the second physical address is associated with clustered storage locations of the memory device that are unassociated with the address hashing scheme.

3. The apparatus of claim 1, wherein the first request is associated with one or more first clients that do not utilize the PIM operations by the memory device, and wherein the second request is associated with one or more second clients that utilize the PIM operations by the memory device.

4. The apparatus of claim 1, wherein the processing system is further configured to receive a hash enable attribute indicating whether the address hashing scheme is enabled or disabled for one or more of the first request or the second request.

5. The apparatus of claim 4, wherein the processing system is further configured to:

determine, based on a first value of the hash enable attribute, that the address hashing scheme is enabled for the first request; and determine, based on a second value of the hash enable attribute, that the address hashing scheme is disabled for the second request.

6. The apparatus of claim 1, wherein the processing system is further configured to:

receive the first request with a first virtual address; and receive the second request with a second virtual address that is pre-hashed in accordance with a hash function associated with the address hashing scheme.

7. The apparatus of claim 6, wherein the processing system is further configured to:

determine the first physical address based on the hash function, wherein the first physical address corresponds to a forward-hashed version of the first virtual address; and determine the second physical address further based on the hash function, wherein the second physical address corresponds to a reverse-hashed version of the second virtual address.

8. The apparatus of claim 7, wherein the second virtual address includes an address offset, and wherein the processing system is further configured to determine the second physical address by applying the hash function to the address offset without applying the hash function to at least one other address portion.

9. A method of operation of a memory controller, the method comprising:

sending, to a memory device, a first request associated with a first physical address of the memory device, wherein the first physical address is in accordance with a first address selection scheme that includes an address hashing scheme; and sending, to the memory device, a second request associated with a second physical address of the memory device, wherein, in accordance with the second request being associated with process-in-memory (PIM) operations by the memory device, the second physical address is in accordance with a second address selection scheme different than the first address selection scheme.

10. The method of claim 9, wherein the first physical address is associated with distributed storage locations of the memory device that are selected in accordance with the address hashing scheme, and wherein the second physical address is associated with clustered storage locations of the memory device that are unassociated with the address hashing scheme.

11. The method of claim 9, wherein the first request is associated with one or more first clients that do not utilize the PIM operations by the memory device, and wherein the second request is associated with one or more second clients that utilize the PIM operations by the memory device.

12. The method of claim 9, further comprising receiving a hash enable attribute indicating whether the address hashing scheme is enabled or disabled for one or more of the first request or the second request.

13. The method of claim 12, further comprising:

determining, based on a first value of the hash enable attribute, that the address hashing scheme is enabled for the first request; and determining, based on a second value of the hash enable attribute, that the address hashing scheme is disabled for the second request.

14. The method of claim 9, further comprising:

receiving the first request with a first virtual address; and receiving the second request with a second virtual address that is pre-hashed in accordance with a hash function associated with the address hashing scheme.

15. The method of claim 14, further comprising:

determining the first physical address based on the hash function, wherein the first physical address corresponds to a forward-hashed version of the first virtual address; and determining the second physical address further based on the hash function, wherein the second physical address corresponds to a reverse-hashed version of the second virtual address.

16. The method of claim 15, wherein the second virtual address includes an address offset, and wherein determining the second physical address includes applying the hash function to the address offset without applying the hash function to at least one other address portion.

17. A non-transitory computer-readable medium storing instructions executable by one or more processors to perform operations, the operations comprising:

sending, to a memory device, a first request associated with a first physical address of the memory device, wherein the first physical address is in accordance with a first address selection scheme that includes an address hashing scheme; and sending, to the memory device, a second request associated with a second physical address of the memory device, wherein, in accordance with the second request being associated with process-in-memory (PIM) operations by the memory device, the second physical address is in accordance with a second address selection scheme different than the first address selection scheme.

18. The non-transitory computer-readable medium of claim 17, wherein the first request is associated with one or more first clients that do not utilize the PIM operations by the memory device, and wherein the second request is associated with one or more second clients that utilize the PIM operations by the memory device.

19. The non-transitory computer-readable medium of claim 17, wherein the operations further comprise receiving a hash enable attribute indicating whether the address hashing scheme is enabled or disabled for one or more of the first request or the second request.

20. The non-transitory computer-readable medium of claim 17, wherein the operations further comprise:

receiving the first request with a first virtual address; and receiving the second request with a second virtual address that is pre-hashed in accordance with a hash function associated with the address hashing scheme.

* * * * *